United States Patent
Otomitsu (10) Patent No.: US 10,241,281 B2
(45) Date of Patent: Mar. 26, 2019

(54) OPTICAL CONNECTOR AND OPTICAL CONNECTOR SYSTEM

(71) Applicant: FUJIKURA LTD., Tokyo (JP)

(72) Inventor: Takahito Otomitsu, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/770,157

(22) PCT Filed: Dec. 13, 2016

(86) PCT No.: PCT/JP2016/087107
§ 371 (c)(1),
(2) Date: Apr. 20, 2018

(87) PCT Pub. No.: WO2017/130588
PCT Pub. Date: Aug. 3, 2017

(65) Prior Publication Data
US 2018/0306984 A1 Oct. 25, 2018

(30) Foreign Application Priority Data

Jan. 29, 2016 (JP) ................. 2016-015360

(51) Int. Cl.
*G02B 6/38* (2006.01)
*G02B 6/40* (2006.01)
*G02B 6/26* (2006.01)

(52) U.S. Cl.
CPC ............. *G02B 6/403* (2013.01); *G02B 6/26* (2013.01); *G02B 6/3833* (2013.01); *G02B 6/3897* (2013.01); *G02B 6/40* (2013.01)

(58) Field of Classification Search
CPC ..... G02B 6/403; G02B 6/3833; G02B 6/3897
See application file for complete search history.

(56) References Cited

U.S. PATENT DOCUMENTS

| 4,852,963 A | 8/1989 | Lampert |
| 5,011,258 A | 4/1991 | Takeda |
| 5,432,879 A | 7/1995 | Lee |

(Continued)

FOREIGN PATENT DOCUMENTS

| JP | S62-124513 A | 6/1987 |
| JP | S64-023210 A | 1/1989 |

(Continued)

OTHER PUBLICATIONS

Office Action issued in corresponding Japanese Patent Application No. 2016-015360 dated Aug. 22, 2017 (2 pages).

*Primary Examiner* — Ryan A Lepisto
(74) *Attorney, Agent, or Firm* — Osha Liang LLP (57) ABSTRACT

An optical connector includes: a ferrule that has a brim part; an elastic member that presses the ferrule; a housing that houses the ferrule retractably, and the housing has a protrusion that contacts the brim part of the ferrule, which is pressed by the elastic member in which the protrusion prevents the ferrule from falling out forward; and a regulating part that regulates a rear side limiting position of the ferrule. An interval from a position of the ferrule to the rear side limiting position when the connector is connected is smaller than a retraction amount that the ferrule has retracted when the connector is connected.

8 Claims, 9 Drawing Sheets

(WHEN CONNECTOR IS CONNECTED)

(56) References Cited

U.S. PATENT DOCUMENTS

| | | | | |
|---|---|---|---|---|
| 6,769,814 B2 * | 8/2004 | Kiani | ............ | G02B 6/3821 |
| | | | | 385/60 |
| 6,796,721 B2 * | 9/2004 | Matsumoto | ........ | G02B 6/3885 |
| | | | | 385/56 |
| 2011/0085764 A1 * | 4/2011 | Greub | ............ | G02B 6/3879 |
| | | | | 385/60 |
| 2015/0198766 A1 * | 7/2015 | Takahashi | ........ | G02B 6/2558 |
| | | | | 385/78 |

FOREIGN PATENT DOCUMENTS

| | | |
|---|---|---|
| JP | H03-42106 U | 4/1991 |
| JP | H07-020356 A | 1/1995 |
| JP | H11-305071 A | 11/1999 |
| JP | 2008-191410 A | 8/2008 |
| JP | 2010-224195 A | 10/2010 |
| JP | 2011-075829 A | 4/2011 |

* cited by examiner

FIG. 1A
(BEFORE CONNECTOR IS CONNECTED)

FIG. 1B
(WHEN CONNECTORS ARE CONNECTED)

FIG. 1C
(COMPARATIVE EXAMPLE)

FIG. 3A (BEFORE CONNECTOR IS CONNECTED)

FIG. 3B (WHEN CONNECTOR IS CONNECTED)

FIG. 9A (BEFORE CONNECTOR IS CONNECTED)

FIG. 9B (WHEN CONNECTOR IS CONNECTED)

OPTICAL CONNECTOR AND OPTICAL CONNECTOR SYSTEM

TECHNICAL FIELD

The present disclosure relates to an optical connector and an optical connector system.

BACKGROUND

As an example of an optical connector having a ferrule housed retractably in a housing, for example, an MPO connector disclosed in Non-Patent Literature 1 is known. With this optical connector, a ferrule is pressed to a front side (a side of the optical connector to the other side) with an elastic member, and the protrusion of the housing and the brim part (flange part) of the ferrule come into contact to prevent the ferrule from falling out forward. When the optical connector connects with an optical connector to the other side (hereafter, when a connector is connected), end-faces of the ferrules are butted against each other, and the ferrule retracts into the housing at this time.

CITATION LIST

Non-Patent Literature

[NPTL 1] Japanese Standards Association, "F13 type connectors for optical fiber ribbons, C 5982: 1997", JIS Handbook, Electronic Test Method•Optoelectronics Edition, Publisher: Japan Standards Association, Apr. 24, 1998.

When optical fibers (including optical cables, optical cords and the like) are pulled to a rear side after the connector has been connected, in some cases a ferrule retracts further from a position of the ferrule when the connector is connected. As a result, end-faces of ferrules butted to each other come apart, and there is a possibility of the optical connection being disconnected.

SUMMARY

One or more embodiments of the present invention hold end-faces of ferrules in a butted state even when the ferrule retracts further from a position of the ferrule when a connector is connected.

One or more embodiments are directed to an optical connector including: a ferrule having a brim part; an elastic member that presses the ferrule; a housing that houses the ferrule retractably, the housing having a protrusion that contacts the brim part of the ferrule being pressed with the elastic member, the protrusion preventing the ferrule from falling out forward; and a regulating part that regulates a rear side limiting position of the ferrule, wherein an interval from a position of the ferrule when a connector is connected to the rear side limiting position is smaller than a retraction amount that the ferrule has retracted when the connector is connected.

Other features will become clear from the description in the specification and drawings to be described later.

According to one or more embodiments of the present invention, even when the ferrule retracts further from the position of the ferrule when the connector is connected, the state where end-faces of the ferrules are butted can be maintained.

BRIEF DESCRIPTION OF DRAWINGS

FIG. 2A and FIG. 2B are perspective views of an optical connector 3 according to one or more embodiments.

DETAILED DESCRIPTION

At least below matters will become clear from descriptions in this specification and attached drawings described below.

An optical connector will become clear comprising: a ferrule having a brim part; an elastic member that presses the ferrule; a housing that houses the ferrule retractably, the housing having a protrusion that contacts the brim part of the ferrule being pressed with the elastic member, the protrusion preventing the ferrule from falling out forward; and a regulating part that regulates a rear side limiting position of the ferrule, wherein an interval from a position of the ferrule when a connector is connected to the rear side limiting position is smaller than a retraction amount that the ferrule has retracted when the connector is connected. According to such an optical connector, even when the ferrule retracts further from the position of the ferrule when the connector is connected, the state in which the end-faces of the ferrules are butted against each other can be maintained.

An optical connector may comprise a receiving part to fix a rear end of the elastic member to the housing, and wherein the regulating part may be provided to the receiving part. In this way, the receiving part can also serve as the regulating part.

The receiving part may have an engaging part that engages with an engaging hole of the housing, and the regulating part may be provided to the engaging part. In this way, the engaging part can also serve as the regulating part.

The receiving part may have a fastening part that fixes a rear end of the elastic member, and the regulating part may be provided to the fastening part. In this way, the fastening part can also serve as the regulating part.

The elastic member may be a coil-shaped spring, and the regulating part may be arranged inside a spring. In this way, space can be saved.

The ferrule may have a recess portion recessed from an end-face and a lens part that passes through an optical signal, the lens part being formed in the recess portion. In such a case, providing the regulating part becomes particularly advantageous.

A pressing force of the elastic member that presses the ferrule may be in a range of 2N to 7N. In such a case, providing the regulating part becomes particularly advantageous.

An optical connector will become clear comprising: a ferrule having a brim part; an elastic member that presses the ferrule; a housing that houses the ferrule retractably, the housing having a protrusion that contacts the brim part of the ferrule being pressed with the elastic member, the protrusion preventing the ferrule from falling out forward; and a regulating part that regulates a rear side limiting position of the ferrule, wherein an interval from a position of the ferrule when a connector is connected to the rear side limiting position is smaller than an interval between the protrusion and the brim part when the connector is connected. According to such an optical connector, even when the ferrule retracts further from the position of the ferrule when the connector is connected, the state in which the end-faces of the ferrules are butted against each other can be maintained.

An optical connector system that connects two optical connectors will become clear, wherein each of the optical connectors includes a ferrule having a brim part, an elastic member that presses the ferrule, a housing that houses the ferrule retractably, the housing having a protrusion that contacts the brim part of the ferrule being pressed with the elastic member, the protrusion preventing the ferrule from falling out forward, and a regulating part that regulates a rear side limiting position of the ferrule, wherein an interval from a position of the ferrule of one optical connector when a connector is connected to the rear side limiting position is smaller than a retraction amount that the ferrule of another optical connector has retracted when the connector is connected. According to such an optical connector system, even when the ferrule retracts further from the position of the ferrule when the connector is connected, the state in which the end-faces of the ferrules are butted against each other can be maintained.

An optical connector system that connects two optical connectors will become clear, wherein each of the optical connector includes a ferrule having a brim part, an elastic member that presses the ferrule, a housing that houses the ferrule retractably, the housing having a protrusion that contacts the brim part of the ferrule being pressed with the elastic member, the protrusion preventing the ferrule from falling out forward, and a regulating part that regulates a rear side limiting position of the ferrule, wherein an interval from a position of the ferrule of one optical connector when a connector is connected to the rear side limiting position is smaller than an interval between the protrusion of another optical connector and the brim part when the connector is connected. According to such an optical connector system, even when the ferrule retracts further from the position of the ferrule when the connector is connected, the state in which the end-faces of the ferrules are butted against each other can be maintained.

Figure 1A:
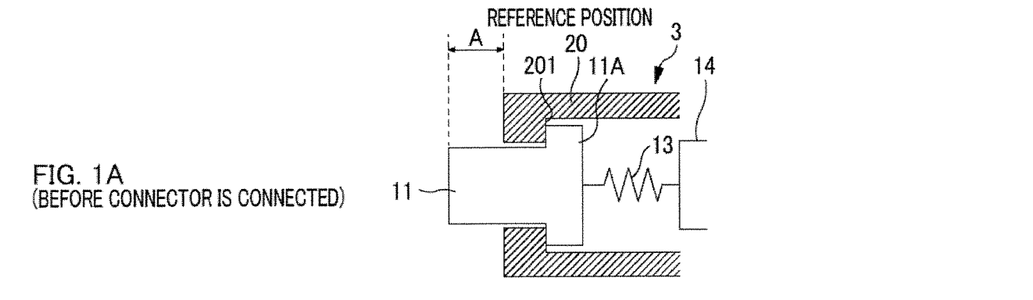
FIG. 1A is a reference view describing the state of an optical connector 3 before a connector is connected.

FIG. 1A is a reference view describing the state of an optical connector 3 before connection of the connector. In the description below, a front-rear direction is defined, as shown in FIG. 1A. In other words, a direction of attaching and detaching the optical connector 3 is defined as a "front-rear direction", and a side of the optical connector 3 to the other side is referred to as "front", and an opposite side is referred to as "back".

The optical connector 3 has a ferrule 11, an elastic member 13, and a housing 20. The ferrule 11 is a member that holds end parts of optical fibers, which are not shown, and has a brim part 11A (flange part). The elastic member 13 is compressed and deformed, and presses the ferrule 11 to the front side. Here, a receiving part 14 is fixed to the housing 20, and a rear end of the elastic member 13 is fixed to the receiving part, such that the elastic member 13 is compressed and deformed between the ferrule 11 and the receiving part 14. The housing 20 has a protrusion 201 that contacts the brim part 11A, and houses the ferrule 11 retractably. The brim part 11A of the ferrule 11 contacts the protrusion 201 of the housing 20, to prevent the ferrule 11 that is being pressed to the front side from falling out forward. Here, a front side end-face of the housing 20 is a reference position, and a length from the reference position to an end-face of the ferrule 11 is referred to as A.

Figure 1B:
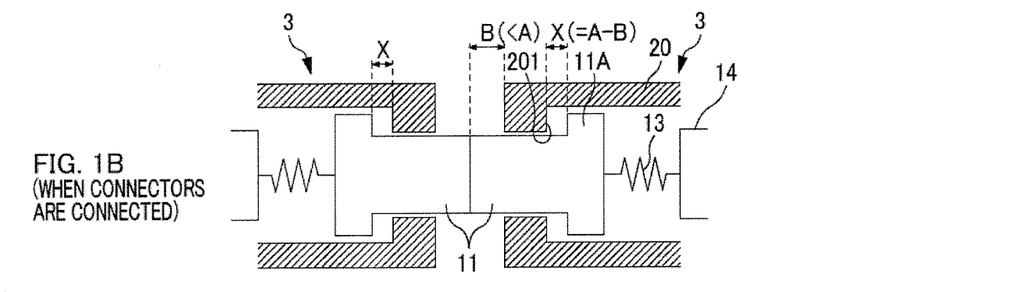
FIG. 1B is a reference view describing the state of an optical connector system when connectors are connected.

FIG. 1B is a reference diagram describing the state of an optical connector system when connectors are connected. When connectors are connected, end-faces of ferrules 11 are butted against each other. At this time, the ferrule 11 is pushed with the ferrule 11 of an optical connector 3 to the other side, and retracts into the housing 20. Here, a length from a reference position to an end-face of the ferrule 11 when the connector is connected is referred to as B. Because the ferrule 11 has retracted, B is shorter than A. When a retraction amount that the ferrule 11 has retracted when the connector is connected is X, the retraction amount X corresponds to A-B. Because the ferrule 11 retracts when the connector is connected, a brim part 11A of the ferrule 11 comes apart from the protrusion 201 of the housing 20. Thus, an interval between the protrusion 201 of the housing 20 and the brim part 11A of the ferrule 11 when the connector is connected corresponds to the retraction amount X. When the connector is connected, the ferrule 11 of the optical connector 3 to the other side also retracts for approximately the same retraction amount X.

Figure 1C:
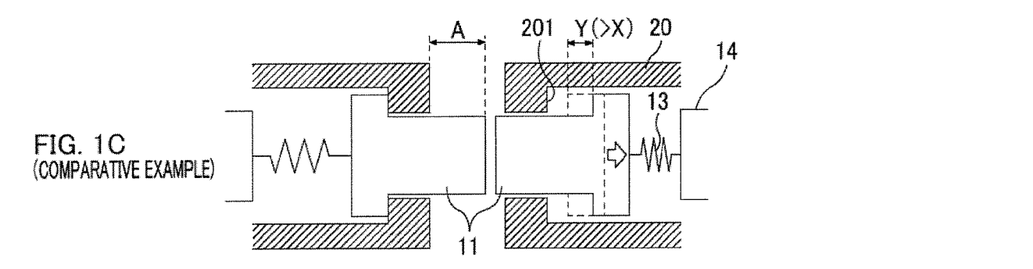
FIG. 1C is an explanatory view of a comparative example.

FIG. 1C is an explanatory view of a comparative example. Because the ferrule 11 holds end parts of optical fibers, in the case where optical fibers (including optical cables, optical cords and the like) are pulled to the rear side, the ferrule 11 will move to the rear side. As a result, as shown in FIG. 1C, there is a possibility that the ferrules 11 having the end-faces butted against each other will come apart and cause disconnection of optical connections.

As shown in FIG. 1C, in the case where the ferrule 11 moves to the rear side more than the retraction amount X from the position of the ferrule 11 when the connector is connected, the ferrules 11 that had end-faces butting against each other will come apart. On the other hand, supposing that the ferrule 11 moves further to the rear side from the position of the ferrule 11 when the connector is connected, as long as the moving amount is smaller than the retraction amount X, the ferrule 11 of the optical connector 3 to the other side can move for the amount of the retraction amount X. Thus, the state in which the end-faces of the ferrules 11 can be butted against each other can be maintained.

Figure 1D:
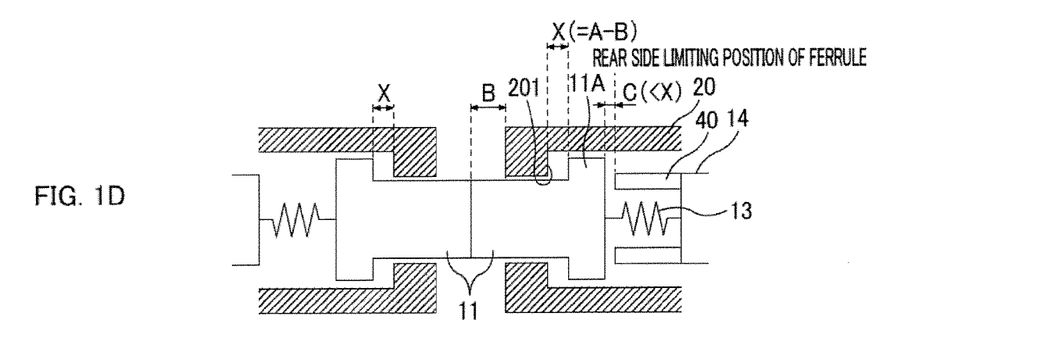
FIG. 1D is an explanatory view of one or more embodiments.

FIG. 1D is an explanatory view of one or more embodiments. An optical connector 3 of one or more embodiments has a regulating part 40 to the rear side of the ferrule 11. The regulating part 40 is a member that regulates a rear side limiting position of the ferrule 11. Supposing that the ferrule 11 moves further to the rear side from the position of the ferrule 11 when the connector is connected, as the regulating part 40 contacts the rear end-face of the ferrule 11, the ferrule 11 is regulated from moving to the rear side any further.

In one or more embodiments, as shown in FIG. 1D, the regulating part 40 is provided such that an interval C from the position of the ferrule 11 when the connector is connected to the rear side limiting position of the ferrule 11 is smaller than the retraction amount X. In other words, the regulating part 40 is provided such that the interval C between the regulating part 40 and the rear end-face of the ferrule 11 (a part that contacts the regulating part 40) when the connector is connected is smaller than the retraction amount X. In this way, supposing that the ferrule 11 moves further to the rear side from the position of the ferrule 11 when the connector is connected, the moving amount can be made smaller than the retraction amount X. Thus, the state in which the end-faces of the ferrules 11 are butted against each other can be maintained.

In FIG. 1D, the position of the ferrule 11 when the ferrule 11 contacts the regulating part 40 is the rear side limiting position of the ferrule 11. Thus, in FIG. 1D, the position of a front edge of the regulating part 40 corresponds to the rear side limiting position of the ferrule 11. As will be described later, however, the regulating part 40 does not have to directly contact the ferrule 11, but the regulating part 40 may contact a member fixed to the ferrule 11 (for example, a pin clamp 12 and the like to be described later), to indirectly regulate the rear side limiting position of the ferrule 11.

In FIG. 1D, the regulating part 40 is provided to a receiving part 14 that fixes the rear end of the elastic member 13 to the housing 20 (for example, a spring push 14 to be described later). The regulating part 40, however, merely needs to be fixed to the housing 20, thus the regulating part 40 can be provided to the housing 20, for example.

Figure 2A:
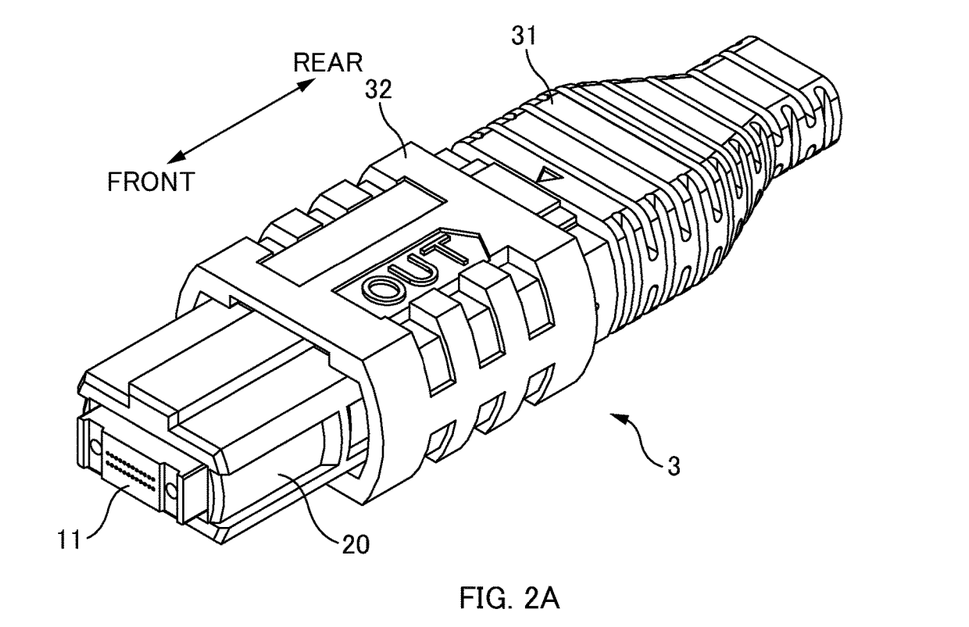
Figure 2B:
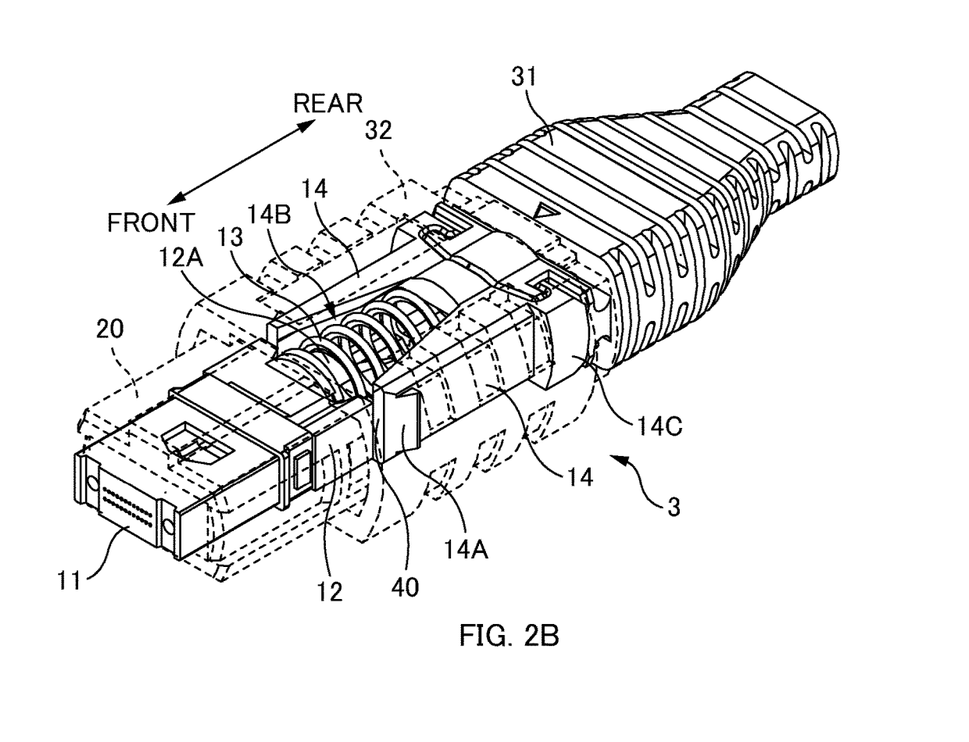
FIG. 2B is a partially transparent explanatory view partially transparently showing a housing 20 and a coupling 32 of FIG. 2A according to one or more embodiments.
Figure 3A:
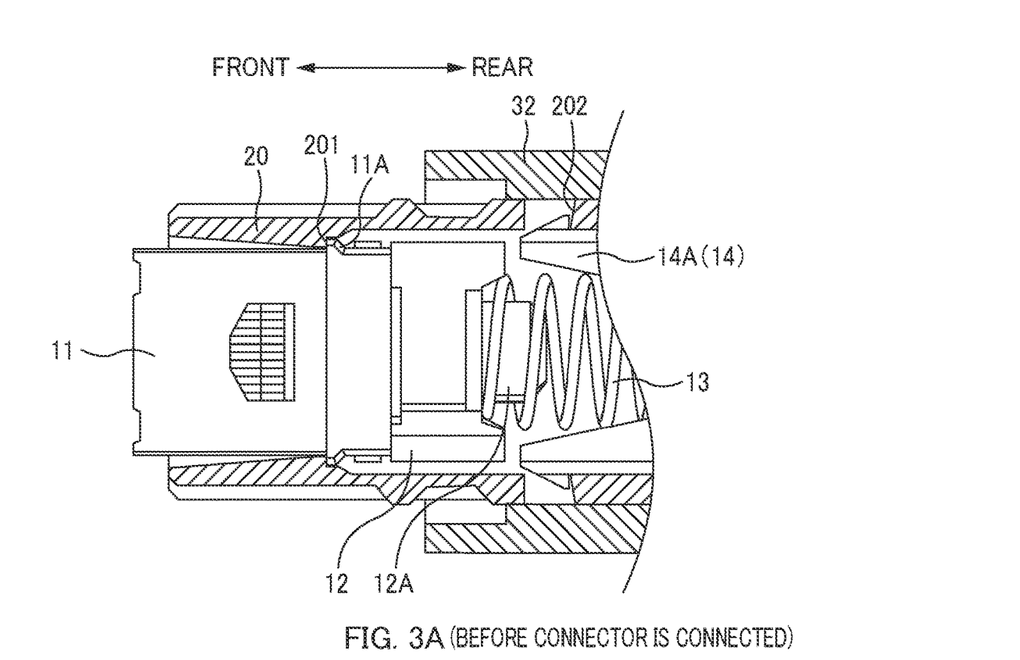
FIG. 3A is a sectional view showing the state in a housing 20 before connection of a connector in one or more embodiments.

FIG. 2A and FIG. 2B are perspective views of an optical connector 3. FIG. 2B is a partially transparent explanatory view partially transparently showing a housing 20 and a coupling 32 in FIG. 2A. FIG. 3A is a sectional view showing the state inside a housing 20 before a connector is connected. In the below description, as shown in FIG. 2A, a rear-front direction is defined. Namely, an attaching and detaching direction of an optical connector 3 is referred to as a "rear-front direction", and a side of an optical connector 3 to the other side is referred to as "front" and an opposite side is referred to as "back".

The optical connector 3 of one or more embodiments is, namely an MPO connector (F13 type connector for optical fiber ribbons defined in JIS C 5982). As shown in FIG. 2A, the optical connector 3 has a ferrule 11, a pin clamp 12, a spring 13, a spring push 14, a housing 20, a boot 31, and a coupling 32.

The ferrule 11 is a member that holds end parts of optical fibers, and here is namely an MT ferrule (F12 type connectors for optical fiber ribbons defined in JIS C 5981). The ferrule 11 is provided with a plurality of optical fiber holes, and each of the optical fiber holes is inserted and fixed with an optical fiber (a bare fiber). When the ferrules 11 are butted against each other when the connectors are connected, the optical fiber end-faces are physically butted against each other, to optically connect the optical fibers together. The rear side of the ferrule 11 is arranged with a pin clamp 12, and the ferrule 11 is pressed to the front side via the pin clamp 12 with the spring 13.

The ferrule 11 has a brim part 11A (flange part) as shown in FIG. 2B. The brim part 11A of the ferrule 11 protrudes outward from a peripheral surface of a ferrule body. When the brim part 11A contacts a protrusion 201 formed to an inner wall surface of the housing 20 (refer to FIG. 3A), the ferrule 11 that is being pressed to the front side is prevented from falling out forward.

The spring 13 is an elastic member that presses the ferrule 11. The spring 13 is arranged between the pin clamp 12 and the spring push 14, in a compressed and deformed state. A front side end part of the spring 13 contacts the pin clamp 12. The rear side end-face of the pin clamp 12 is formed with a spring fastening part 12A. The spring fastening part 12A is inserted in the coil-shaped spring 13, and in this way the front side end part of the spring 13 is fixed. The rear side end part of the spring 13 contacts the spring push 14.

The spring push 14 is a receiving part that fixes a rear end of a spring 13 (elastic member) to the housing 20. The spring push 14 has a pair of engaging parts 14A, a spring housing part 14B, and a boot fixing part 14C.

The engaging parts 14A are regions to be engaged to the housing 20. The engaging parts 14A are engaged to engaging holes 202 (refer to FIG. 3A) of the housing 20, to fix the spring push 14 inside the housing 20. A space is formed between front side end-faces 40 of the engaging parts 14A and the pin clamp 12. The ferrule 11 can be retracted for merely the amount of this space. The front side end-faces 40 of the engaging parts 14A function as regulating parts, and by contacting a rear end-face of the pin clamp 12 regulates the rear side limiting position of the ferrule 11.

The spring housing part 14B is a region that houses the spring 13 and is provided between the pair of the engaging parts 14A. The boot fixing part 14C is a region that is fixed to the boot 31.

The housing 20 is a member that houses the ferrule 11 retractably. The housing 20 houses, as well as the ferrule 11, the pin clamp 12, the spring 13, and the spring push 14 (refer to FIG. 3A). The front side of this housing space is open, and a part of the ferrule 11 protrudes to the front side from the opening, and the end-face of the ferrule 11 is exposed.

The housing 20 has protrusions 201, and engaging holes 202. The protrusions 201 are regions that come in contact with the brim part 11A of the ferrule 11 and prevent the ferrule 11 from falling out forward (refer to FIG. 3A). The protrusions 201 are formed to protrude to the inside from an inner wall surface configuring the housing space. The engaging holes 202 are holes to engage with the engaging parts 14A of the spring push 14. The engaging parts 14A of the spring push 14 engage with the engaging holes 202 of the housing 20, to thus fix the spring push 14 to the housing 20, and the spring 13 is housed in the housing 20 between the pin clamp 12 and the spring push 14 in the compressed and deformed state, and the brim part 11A of the ferrule 11 contacts the protrusions 201, with the ferrule 11 pressed to the front side.

The boot 31 is a member that protects the optical fibers and is arranged to a rear part of the housing 20. Here, the boot 31 and the spring push 14 are fixed with the boot fixing part 14C of the spring push 14.

The coupling 32 is a member provided to the outside of the housing 20 and can be slid in the rear-front direction in respect to the housing 20. When the coupling 32 is slid to the rear side when the connector is connected, the optical connector 3 can be pulled out.

Figure 3B:
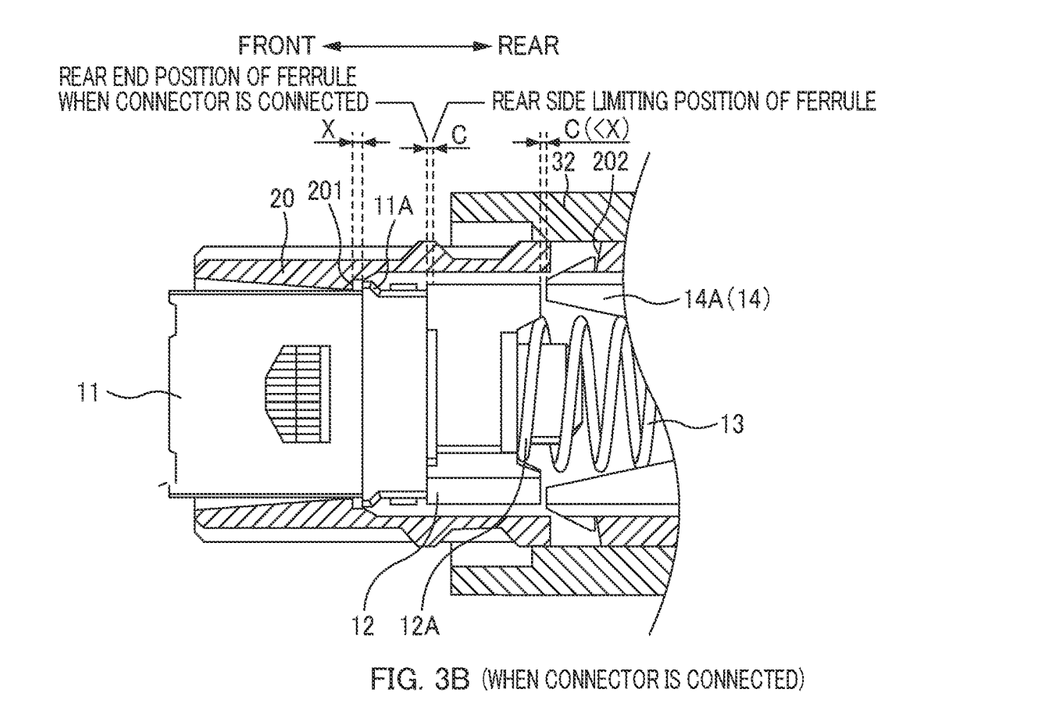
FIG. 3B is an explanatory diagram describing the state when a connector is connected in one or more embodiments.

FIG. 3B is an explanatory view describing the state when the connector is connected in accordance with one or more embodiments. An optical connector 3 to the other side is not shown, but the state of the two optical connectors 3 is about the same.

When the connector is connected, the ferrule 11 retracts inside the housing 20 by being pushed with the ferrule 11 of the optical connector 3 to the other side. In one or more embodiments, a retraction amount that the ferrule 11 has retracting when the connector is connected is referred to as X. An interval between the protrusions 201 of the housing 20 and the brim part 11A of the ferrule 11 when the connector is connected corresponds to the retraction amount X. When the connector is connected, the ferrule 11 of the optical connector 3 to the other side also retracts by approximately the same retraction amount X.

In one or more embodiments, the front side end-faces 40 of the engaging parts 14A of the spring push 14 contact the rear end-face of the pin clamp 12 to regulate the rear side limiting position of the ferrule 11. Thus, the front side end-faces 40 of the engaging parts 14A of the spring push 14 are the regulating parts that regulate the rear side limiting position of the ferrule 11. Supposing that the optical fiber is pulled to the rear side to cause the ferrule 11 to move to the rear side than when the connector is connected, as the front side end-faces 40 of the engaging parts 14A of the spring push 14 contact the rear end-face of the pin clamp 12, the ferrule 11 is regulated from moving to the rear side any further.

In one or more embodiments, as shown in FIG. 3B, the engaging parts 14A (regulating parts) are provided such that the interval C between the front side end-faces 40 (regulating parts) of the engaging parts 14A and the rear end-face of the pin clamp 12 (region contacting the regulating parts) when the connector is connected is smaller than the retraction amount X. In this way, the regulating part is provided such that the interval C from the position of the ferrule 11 when the connector is connected to the rear side limiting position of the ferrule 11 is smaller than the retraction amount X. In this way, supposing that the ferrule 11 moves further to the rear side from the position of the ferrule 11 when the connector is connected, such a moving amount can be made smaller than the retraction amount X, and thus the state in which the end-faces of the ferrule 11 are butted against each other by the ferrule 11 to the other side moving can be maintained.

<Basic Configuration of Optical Connector 3>

Figure 4:
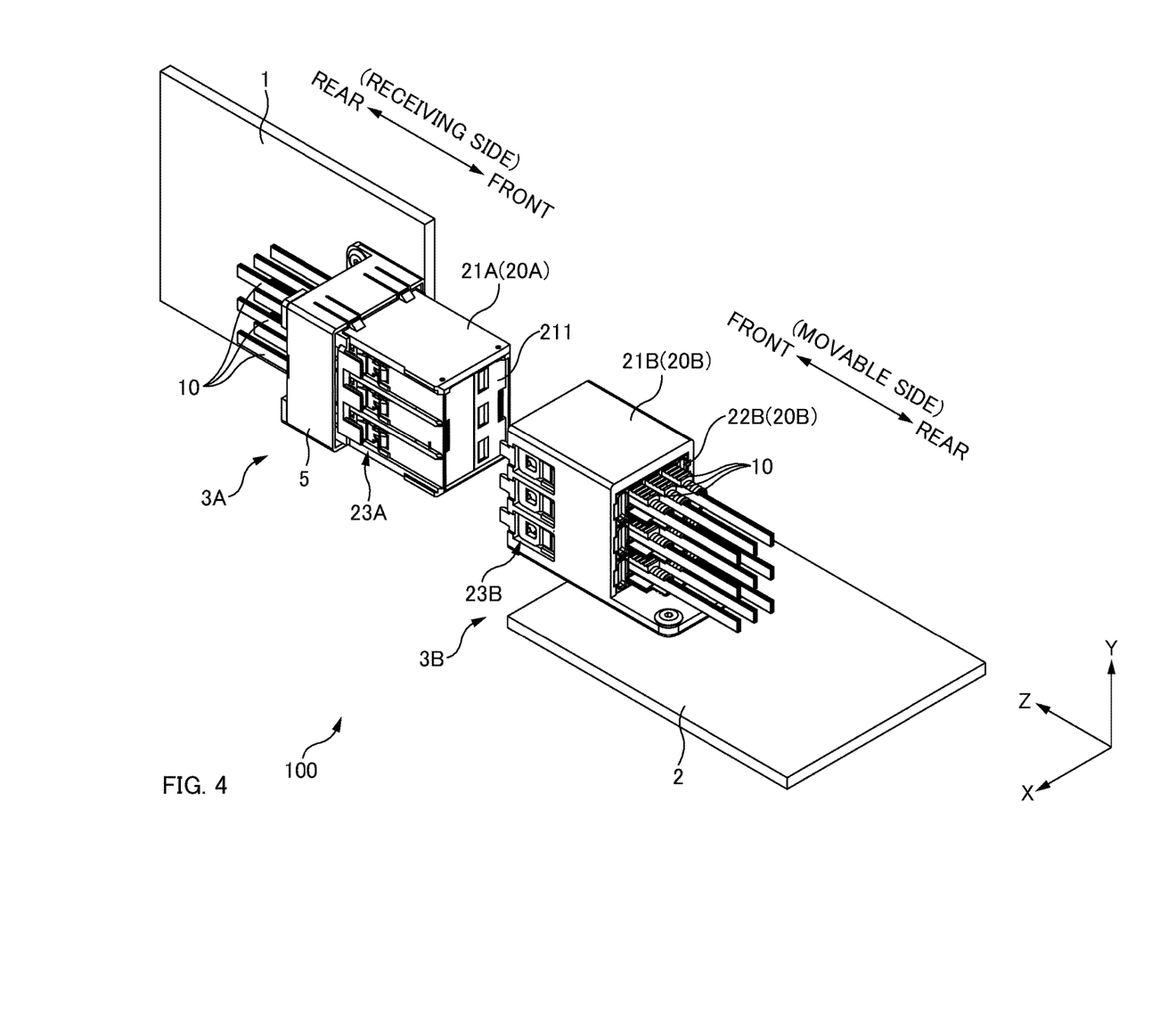
FIG. 4 is a perspective view of an optical connector system 100 in an initial position before connection in one or more embodiments.
Figure 5:
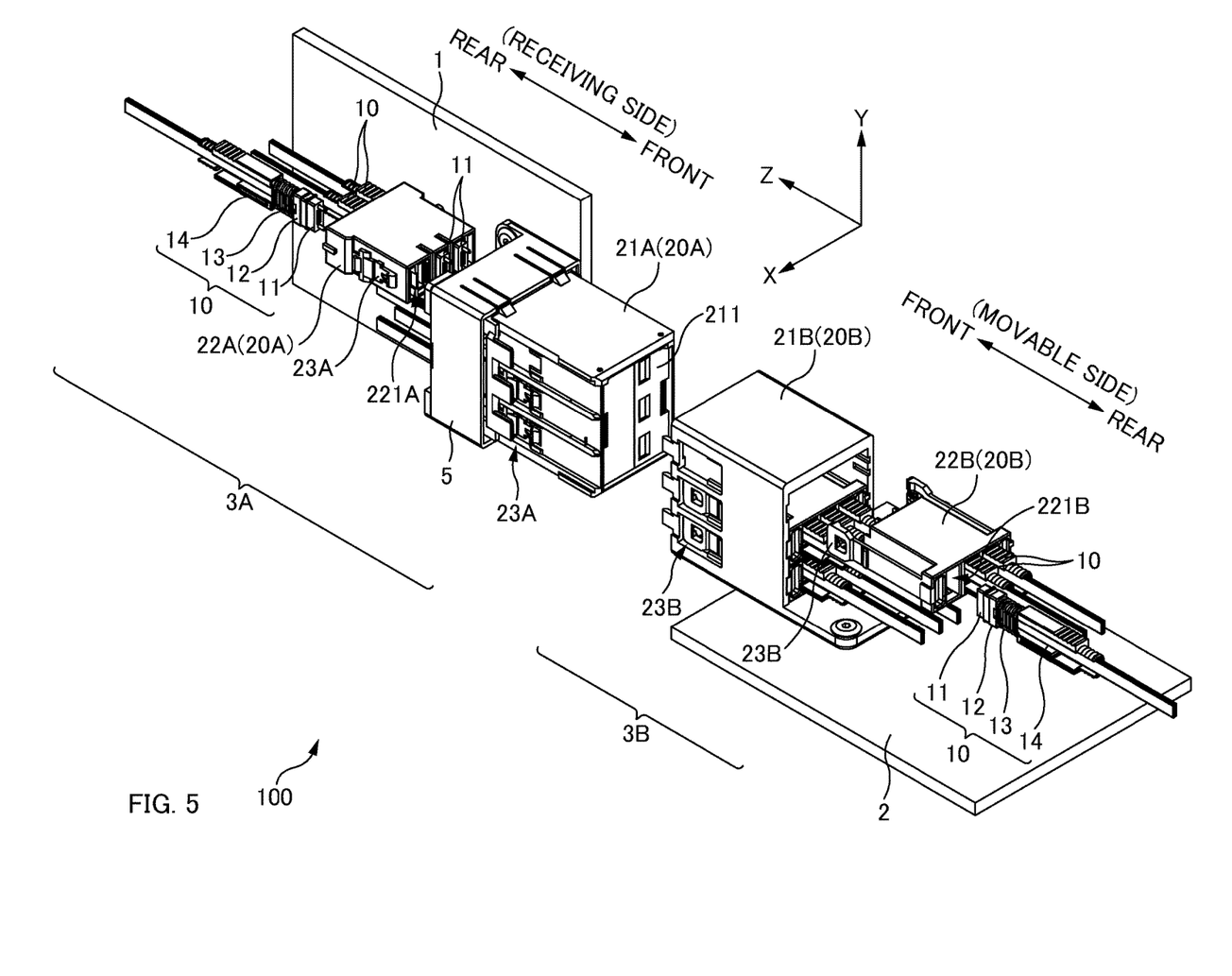
FIG. 5 is an exploded perspective view of an optical connector system 100 in one or more embodiments.
Figure 6A:
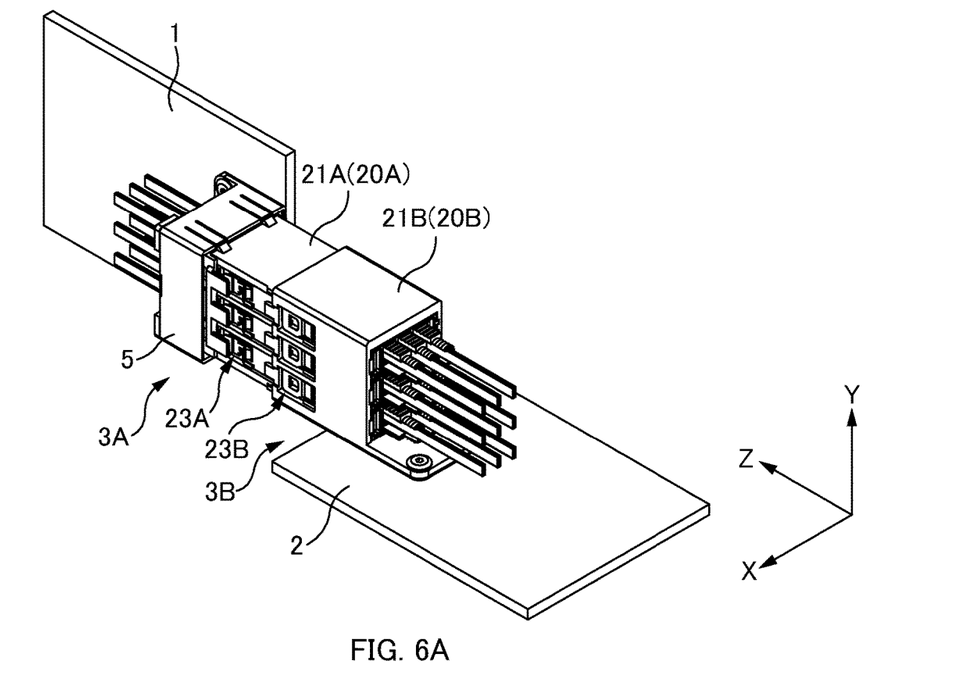
FIG. 6A and FIG. 6B are explanatory views of the state when connectors are connected according to one or more embodiments.
Figure 6B:
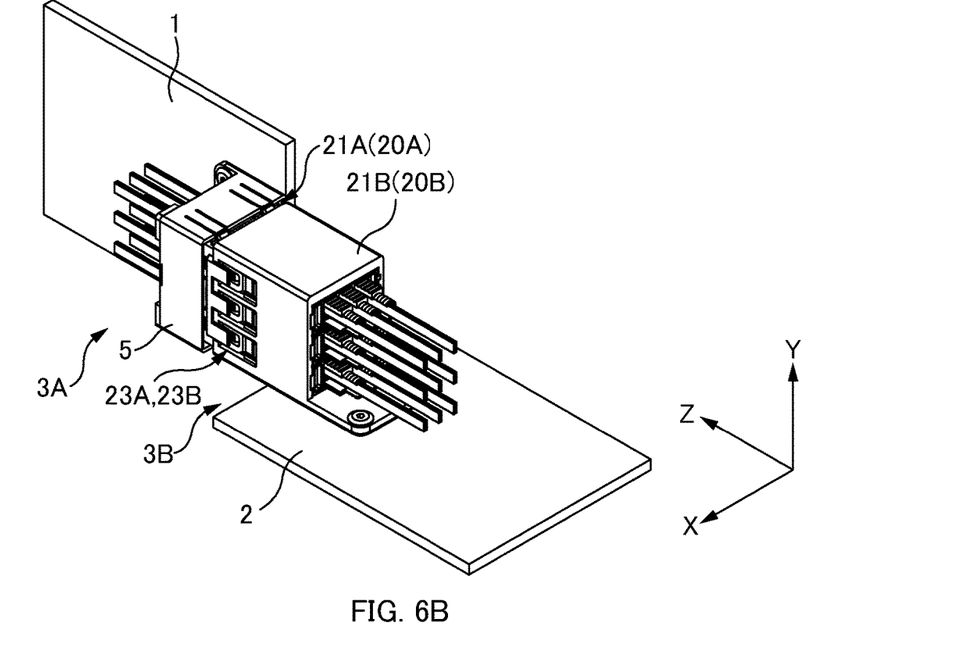

FIG. 4 is a perspective view of an optical connector system 100 in an initial position before being connected in accordance with one or more embodiments. FIG. 5 is an exploded perspective view of the optical connector system 100 of one or more embodiments. FIG. 6A and FIG. 6B are explanatory views of the state when connectors are connected.

The optical connector system 100 of one or more embodiments has a receiving side optical connector 3A (first optical connector) and a movable side optical connector 3B (second optical connector). Here, the receiving side optical connector 3A is attached to a middle plane 1 (first board) of a plug-in unit (not shown). The board to attach the receiving side optical connector 3A, however, is not limited to the middle plane 1, and may be other boards (for example, a backplane and the like). Here, the movable side optical connector 3B is attached to a printed board 2 (second board) that is inserted and removed along a guide groove (not shown) of the plug-in unit. The board to attach the movable side optical connector 3B, however, is not limited to the printed board 2.

In the below description, each direction is defined as shown in FIG. 4. Namely, a connector attaching and detaching direction is referred to as a "Z direction". The Z direction is referred to as a "front-rear direction", and a side of an optical connector 3 to the other side seen from each optical connector 3 is sometimes referred to as "front" and an opposite side is sometimes referred to as "rear". A direction perpendicular to a board surface of the printed board 2 is referred to as a "Y direction", and a direction perpendicular to the Y direction and the Z direction is referred to as an "X direction".

Configuration of Receiving Side Optical Connector 3A

The receiving side optical connector 3A has an optical connector body having a receiving side housing 20A (first housing) and optical modules 10, and a mounting member 5. The optical connector body having the receiving side housing 20A (first housing) and the optical modules 10 is attached to the middle plane 1 via the mounting member 5. The middle plane 1 has a board surface parallel to an YZ plane. The receiving side housing 20A is attached to the mounting member 5 (or the middle plane 1) movably (floatably) in the XY direction.

The receiving side housing 20A is a member to house ferrules 11 (ferrules 11 of optical modules 10). The receiving side housing 20A has an outer housing 21A and an inner housing 22A. The receiving side housing 20A has a receiving side connecting mechanism 23A, and the outer housing 21A and the inner housing 22A is each formed with a region to configure the receiving side connecting mechanism 23A.

The outer housing 21A is a member to house the inner housing 22A. The outer housing 21A is attached with a plurality of (here, 3) the inner housings 22A aligned in a Y direction. A front side opening of the outer housing 21A is an insertion opening to insert the optical modules 10 of the movable side optical connector 3B. A front side opening of the outer housing 21A is provided with an openable and closable shutter 211.

The inner housing 22A is a member to house the optical modules 10, and is a member to attach the optical modules 10 to the outer housing 21A. The inner housing 22A has module mounting parts 221A to mount the optical modules 10. The inner housing 22A has a plurality of (here, 3) module mounting parts 221A, and a plurality of optical modules 10 can be mounted aligned in the X direction. On an inner wall surface of the module mounting part 221A are provided protrusions 201 (not shown in FIG. 5) that contact a brim part 11A (flange part) of the ferrules 11 to prevent the ferrules 11 from falling out forward.

Configuration of Movable Side Optical Connector 3B

The movable side optical connector 3B is attached to the printed board 2. The printed board 2 has a board surface parallel to an XZ plane, and can move along the Z direction. The movable side optical connector 3B moves with the printed board 2 in the Z direction.

The movable side optical connector 3B has a movable side housing 20B (second housing) and optical modules 10.

The movable side housing 20B is a member to house the optical modules 10. The movable side housing 20B has an outer housing 21B, and an inner housing 22B. The movable side housing 20B has a movable side connecting mechanism 23B, and the outer housing 21B and the inner housing 22B is each formed with a region configuring the movable side connecting mechanism 23B.

The outer housing 21B is a member that houses the inner housing 22B. The outer housing 21B is attached with a plurality of (here, 3) the inner housings 22B aligned in the Y direction. A rear part of the outer housing 21B is attached to the printed board 2. A front side opening (not shown) of the outer housing 21B is an insertion opening to insert a front part of the outer housing 21A of the receiving side optical connector 3A (refer to FIG. 6A).

The inner housing 22B is a member to house optical modules 10, and is a member to attach the optical modules 10 to the outer housing 21B. The inner housing 22B has module mounting parts 221B to mount the optical modules 10. Similar to the receiving side optical connector 3A, the inner housing 22B has a plurality of (here, 3) module mounting parts 221B, and a plurality of optical modules 10 can be mounted aligned in the X direction. Similar to the receiving side optical connector 3A, protrusions 201 (not shown in FIG. 5) are provided to inner wall surfaces of the module mounting part 221B to contact a brim part 11A (flange part) of a ferrule 11 and prevent the ferrule 11 from falling out forward.

Configuration of Optical Module 10

Figure 7A:
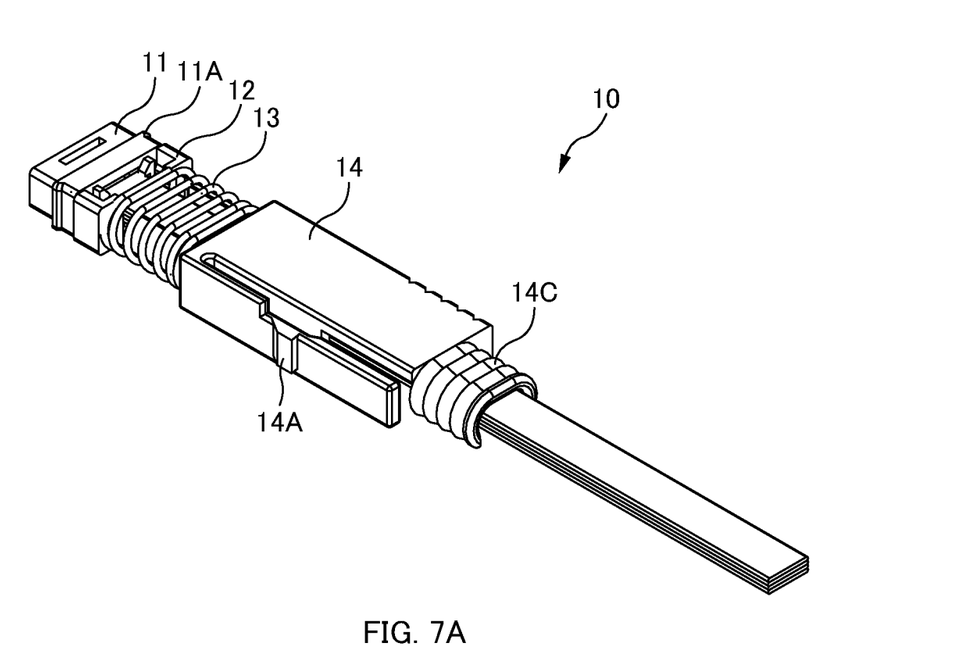
FIG. 7A is a perspective view of an optical module 10 according to one or more embodiments.
Figure 7B:
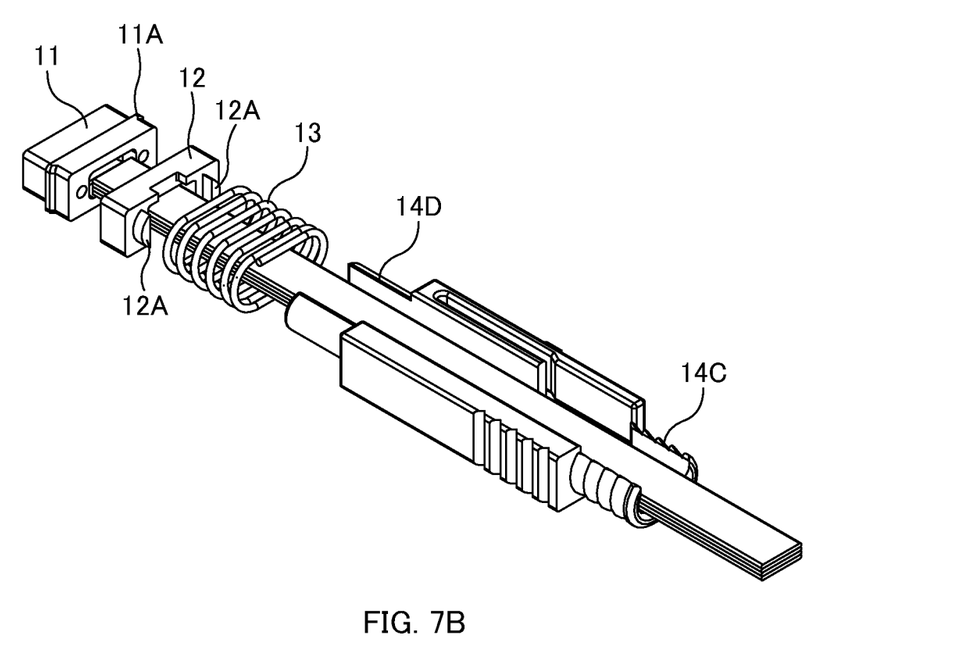
FIG. 7B is an exploded view of an optical module 10.

FIG. 7A is a perspective view of an optical module 10. FIG. 7B is an exploded view of an optical module 10. In FIG. 7A and FIG. 7B the optical module 10 is shown from opposite directions in the X direction.

The optical module 10 is a module attached to an end of an optical fiber (including an optical fiber configuring such as an optical fiber tape, an optical cable, an optical cord). The optical module 10 has a ferrule 11, a pin clamp 12, a spring 13, and a spring push 14. The ferrule 11 is a member to hold end parts of optical fibers. A brim part 11A of the ferrule 11 protrudes outwards from the peripheral surface of the ferrule 11 body and contacts the protrusions 201 formed on an inner wall surface of a module mounting part 221 (221A, 221B) of the inner housing 22 (22A, 22B) (refer to FIG. 9A). The ferrule 11 is housed in the inner housing 22 (22A, 22B) while being pressed to the front side retractably. Specifically, when the optical module 10 is attached by catching the spring push 14 on the inner housing 22 (22A, 22B), the spring 13 is in a compressed and deformed state between the pin clamp 12 and the spring push 14, and with the elastic force of the spring 13, the ferrule 11 is pressed to the front side with a brim part 11A contacting the protrusion 201 on the inner wall surface (refer to FIG. 9A).

In one or more embodiments, a spring fastening part 12A is formed to a rear side end-face of a pin clamp 12. The spring fastening part 12A is inserted in a coil-shaped spring 13, and in this way fixes a front side end part of the spring 13. A rear side end part of the spring 13 is in contact with the spring push 14.

The spring push 14 has an engaging part 14A, and a spring fastening part 14D.

The engaging part 14A in accordance with one or more embodiments is provided to a side surface, and not to a front side end part. As the engaging part 14A engages with an engaging hole (not shown) of the inner housing 22 (22A, 22B), the spring push 14 is fixed to the housing 20 (20A, 20B). In one or more embodiments, the engaging part 14A of the spring push 14 does not function as a regulating part.

The spring fastening part 14D is inserted in the coil-shaped spring 13, and in this way fixes the rear side end part of the spring 13. A space is formed between a rear side end-face of a spring fastening part 12A of the pin clamp 12 and the spring fastening part 14D of the spring push 14, and for the amount of this space the ferrule 11 can be retracted. In one or more embodiments, a front side end-face 40 of the spring fastening part 14D of the spring push 14 functions as the regulating part, and contacts the rear side end-face of the spring fastening part 12A of the pin clamp 12 to regulate the rear side limiting position of the ferrule 11.

Figure 8A:
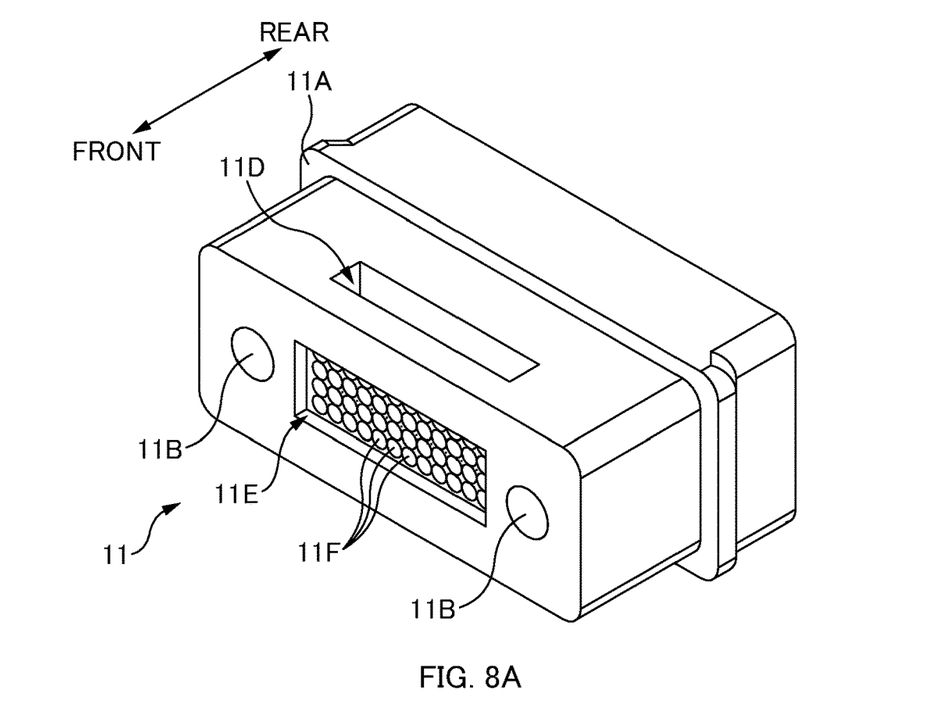
FIG. 8A is a perspective view of a ferrule 11 in one or more embodiments.
Figure 8B:
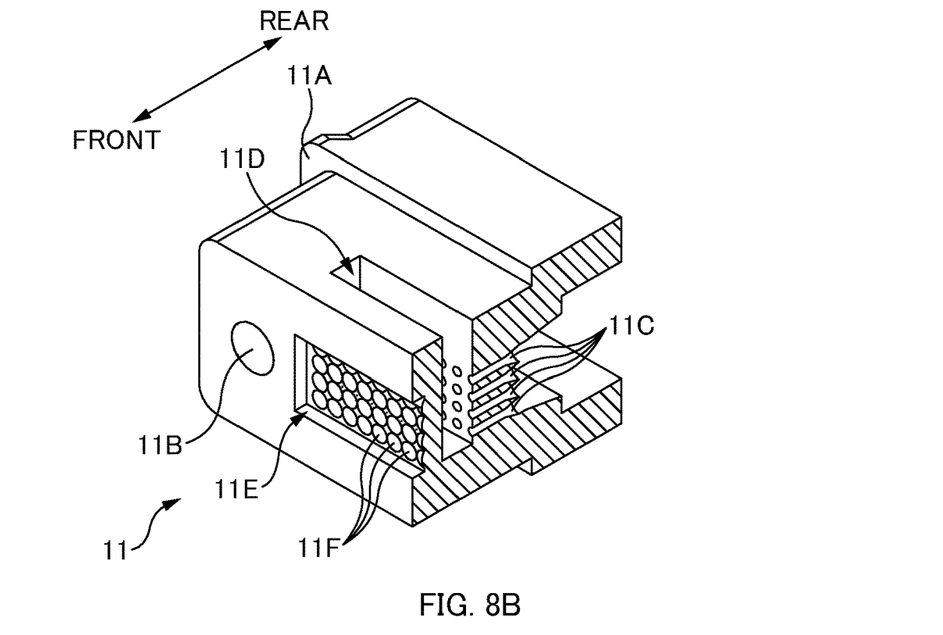
FIG. 8B is a sectional perspective view of a ferrule 11 in one or more embodiments.

FIG. 8A is a perspective view of the ferrule 11 in accordance with one or more embodiments. FIG. 8B is a sectional perspective view of the ferrule 11 in one or more embodiments.

With the ferrule 11 of one or more embodiments described above, an optical fiber end-face is exposed from a ferrule end-face, and in the case that the ferrules 11 are abutted against each other when the connectors are connected, the optical fiber end-faces are butted against each other physically, and the optical fibers are optically connected to each other. On the other hand, with the ferrule 11 in accordance with one or more embodiments, the optical fiber end-faces are not exposed from the ferrule end-face. In one or more embodiments, lens parts 11F are arranged in a recess portion 11E of the ferrule end-face, and optical signals will be input and output to/from the lens parts 11F. In other words, with the ferrule 11 of one or more embodiments, as there is no physical contact between optical fiber end-faces, deterioration does not easily occur even when attaching and detaching is repeated, and durability is high.

In one or more embodiments, the ferrule 11 is a member that holds end parts of optical fibers, and has a brim part 11A. The ferrule 11 in accordance with one or more embodiments is integrally formed with a resin (transparent resin) that can transmit optical signals.

The ferrule 11 has a pair of guide pin hole 11B, optical fiber holes 11C, a filling part 11D, a recess portion 11E, lens parts 11F, and light transmitting parts 11G. The guide pin holes 11B are holes to insert guide pins. The optical fiber holes 11C are holes to insert optical fibers. The filling part 11D is a hollow part to fill a refractive index matching material. The optical fiber holes 11C are open in an inner wall surface to a rear side of the filling part 11D. A front side inner wall surface of the filling part 11D is a surface that opposes with the opening of the optical fiber holes, and is an abutting surface to which end-faces of optical fibers inserted through the optical fiber holes 11C will be abutted. With the end-faces of the optical fibers abutted to the abutting surface, the refractive index matching material which is the adhesive is filled in the filling part 11D, and end parts of the optical fibers are held in the ferrule 11. The recess portion 11E is a region recessed in respect to the ferrule end-face. The lens parts 11F are arranged corresponding to the optical fiber holes 11C, and optical signals will be input and output via the lens parts 11F (optical signals pass through the lens parts 11F). The lens parts 11F function as, for example, collimating lenses, and by inputting and outputting optical signals that have been enlarged in diameter with the lens parts 11F, can decrease the influence of dust and the like in the optical paths, and can suppress transmission loss of optical signals. The light transmitting parts 11G are regions that transmit optical signals between abutting surfaces of optical fibers (a front side inner wall surface of the filling part 11D) and the lens parts 11F.

With the ferrule 11 in accordance with one or more embodiments, optical fibers can be optically connected to each other without having to physically butt optical fiber end-faces against each other as with the ferrule 11 in accordance with one or more embodiments described above. Thus, in the case of using the ferrule 11 of one or more embodiments, a pressing force of the spring 13 that presses the ferrule 11 to the front side can be set relatively weak. Specifically, in one or more embodiments described above the pressing force is set to approximately 9N to 13N, whereas in other embodiments the pressing force can be set to approximately 2N to 7N. In the case that the pressing force of the spring 13 is set weak, however, supposing that the optical fibers are pulled to the rear side, then the ferrule 11 will easily move to the rear side.

Figure 9A:
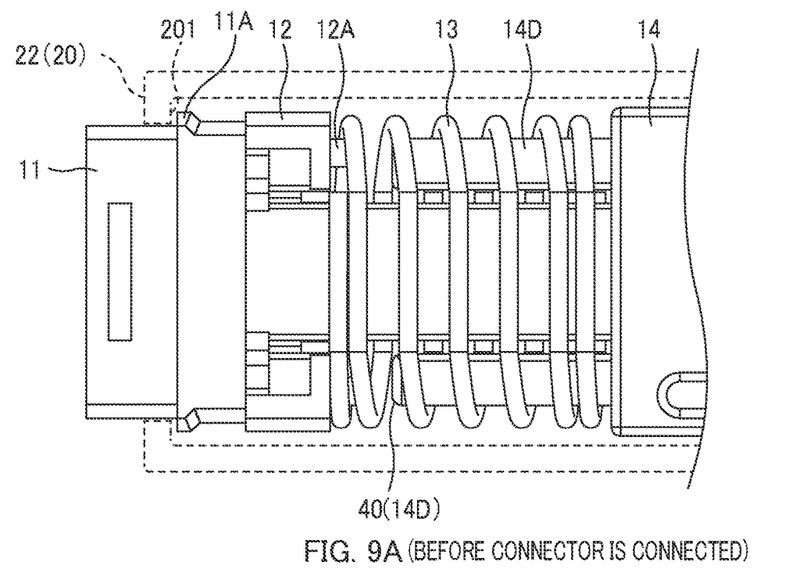
FIG. 9A is an explanatory view showing the state of an optical module 10 before connection of a connector in one or more embodiments.
Figure 9B:
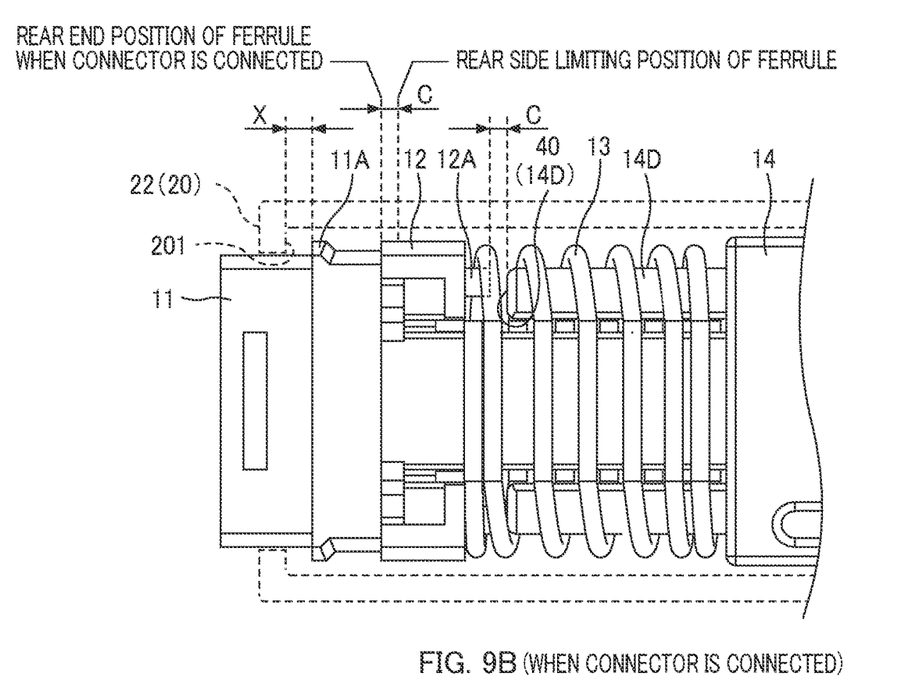
FIG. 9B is an explanatory view showing the state of an optical module 10 when a connector is connected in one or more embodiments.

FIG. 9A is an explanatory view showing the state of the optical module 10 before the connector is connected in accordance with one or more embodiments. FIG. 9B is an explanatory view showing the state of the optical module 10 when the connector is connected in accordance with one or more embodiments.

When the connector is connected, the ferrule 11 is pushed with a ferrule 11 of an optical connector 3 to the other side, and retracts inside the inner housing 22 (22A, 22B). Also, in one or more embodiments, a retraction amount that the ferrule 11 has retracted when the connector is connected is X. An interval between the protrusion 201 of the inner housing 22 (22A, 22B) when the connector is connected and the brim part 11A of the ferrule 11 corresponds to the retraction amount X. When the connector is connected, the ferrule 11 of the optical connector 3 to the other side also retracts for approximately the same retraction amount X.

In one or more embodiments, the front side end-face 40 of the spring fastening part 14D of the spring push 14 contacts the rear end-face of the spring fastening part 12A of the pin clamp 12 to regulate the rear side limiting position of the ferrule 11. Thus, the front side end-face 40 of the spring fastening part 14D of the spring push 14 is the regulating part to regulate the rear side limiting position of the ferrule 11. Supposing that the optical fibers are pulled to the rear side causing the ferrule 11 to move to the rear side than when the connector is connected, the front side end-face 40 of the spring fastening part 14D of the spring push 14 contacts the rear end-face of the spring fastening part 12A of the pin clamp 12, to regulate the ferrule 11 from moving to the rear side any further.

In one or more embodiments, as shown in FIG. 9B, the spring fastening part 14D (regulating part) of the spring push 14 is provided such that an interval C between the front side end-face 40 (regulating part) of the spring fastening part 14D of the spring push 14 when the connector is connected and the rear end-face (the region that contacts the regulating part) of the spring fastening part 12A of the pin clamp 12 is smaller than the retraction amount X. Thus, the regulating part is provided such that the interval C from the position of the ferrule 11 when the connector is connected to the rear side limiting position of the ferrule 11 is smaller than the retraction amount X. In this way, supposing that the ferrule 11 moves further to the rear side from the position of the ferrule 11 when the connector is connected, the moving amount can be made smaller than the retraction amount X. Thus, when the ferrule 11 to the other side moves the end-faces of the ferrules 11 can be maintained in the state butted against each other.

In one or more embodiments, the spring fastening part 14D (regulating part) of the spring push 14 is inserted in the coil-shaped spring 13, and further the spring fastening part 12A (the region that contacts the regulating part) of the pin clamp 12 is inserted in the coil-shaped spring 13. In this way, the spring fastening part 14D of the spring push 14 and the spring fastening part 12A of the pin clamp 12 come into contact inside the coil-shaped spring 13. In this manner, by arranging the regulating part inside the spring 13, space can be saved, compared to the case in which the regulating part 40 is arranged outside the spring 13.

The optical connector 3 in accordance with one or more embodiments has the ferrule 11 having the brim part 11A, the elastic member 13 (including the spring 13) that presses the ferrule 11, the housing 20 (including the receiving side housing 20A and the movable side housing 20B) that has the protrusion 201 and houses the ferrule 11 retractably, and the regulating part 40 that regulates the rear side limiting position of the ferrule 11. In one or more embodiments, the interval C from the position of the ferrule 11 when the connector is connected to the rear side limiting position is smaller than the retraction amount X that the ferrule 11 has retracted when the connector is connected (refer to FIG. 1D, FIG. 3B, FIG. 9B). In this way, supposing that the ferrule 11 further moves to the rear side from the position of the ferrule 11 when the connector is connected, such a moving amount can be made smaller than the retraction amount X, thus the state where the end-faces of the ferrules 11 are butted against each other can be maintained.

The optical connector 3 in accordance with one or more embodiments has the receiving part 14 (including the spring push 14) that fixes the rear end of the elastic member 13 to the housing 20, and the regulating part 40 is provided to the receiving part 14 (refer to FIG. 1D, FIG. 3B, FIG. 9B). In this way, the receiving part 14 can also serve as the regulating part 40. The regulating part 40, however, is to be fixed to the housing 20, and so the regulating part 40 can be provided to the housing 20, for example.

In one or more embodiments, the regulating part 40 is provided to the engaging part 14A (refer to FIG. 3B). In this way, the engaging part 14A can also serve as the regulating part 40. Further, in one or more embodiments, the regulating part 40 is provided to the fastening part 14D that fixes the rear end of the elastic member 14 (refer to FIG. 9B). In this way, the fastening part 14D can also serve as the regulating part 40. The regulating part 40, however, may be configured such that other members do not also serve as the regulating part 40.

In one or more embodiments, the elastic member 13 is the coil-shaped spring, and the regulating part 40 is arranged inside the spring 13 (refer to FIG. 9B). In this way, space can be saved compared to when the regulating part 40 is arranged outside the spring 13.

In one or more embodiments, the ferrule 11 has the recess portion 11E recessed from the end-face and the lens parts 11F formed in the recess portion (refer to FIG. 8A, FIG. 8B). With such a ferrule 11, because the optical fiber end-faces do not physically contact each other the pressing force of the elastic member 13 can be set weak, but supposing that the optical fibers are pulled to the rear side the ferrule 11 easily moves to the rear side, and so to provide the regulating part 40 to the optical connector 3 having such a ferrule 11 will be particularly effective.

In one or more embodiments, the pressing force of the elastic member 13 to press the ferrule 11 to the front side is within a range of 2N to 7N. Thus, the pressing force is weak compared to the pressing force when the optical fiber end-faces physically contact each other (approximately 9N to 13N), thus supposing that the optical fibers are pulled to the rear side the ferrule 11 easily moves to the rear side, and in this case providing the regulating part 40 will be particularly effective.

In one or more embodiments, the interval C from the position of the ferrule 11 when the connector is connected to the rear side limiting position is smaller than the interval X between the protrusion 201 of the housing 20 when the connector is connected and the brim part 11A of the ferrule 11 (refer to FIG. 1D, FIG. 3B, FIG. 9B). In this way, supposing that the ferrule 11 moves further to the rear side from the position of the ferrule 11 when the connector is connected, the moving amount can be made smaller than the retraction amount X, thus the state in which the end-faces of the ferrules 11 are butted against each other can be maintained.

In one or more embodiments, the optical connector system to connect two optical connectors 3 is disclosed. In some of the above embodiments, the interval C from the position of the ferrule 11 of one of the optical connectors 3 when the connector is connected to the rear side limiting position is smaller than the retraction amount X that the ferrule 11 of the optical connector 3 to the other side (the other optical connector) retracts when the connector is connected (refer to FIG. 1D, FIG. 3B, FIG. 9B). In other words, in one or more embodiments, the interval C from the position of the ferrule 11 of one of the optical connectors 3 when the connector is connected to the rear side limiting position, is smaller than the interval X between the protrusion 201 of the housing 20 of the optical connector 3 to the other side (the other optical connector) when the connector is connected and the brim part 11A of the ferrule 11 (refer to FIG. 1D, FIG. 3B, FIG. 9B). In this way, supposing that the ferrule 11 moves further to the rear side from the position of the ferrule 11 when the connector is connected, the moving amount can be made smaller than the retraction amount X, and the state in which the end-faces of the ferrules 11 are butted against each other can be maintained.

REFERENCE SIGNS LIST 1 middle plane,
2 printed board,
3 optical connector (3A receiving side optical connector, 3B movable side optical connector),
5 mounting member,
10 optical module,
11 ferrule,
11A brim part,
11B guide pin hole,
11C optical fiber hole,
11D filling part,
11E recess portion,
11F lens part,
11G light transmitting part,
12 pin clamp,
12A spring fastening part,
13 spring,
14 spring push,
14A engaging part,
14B spring housing part,
14C boot fixing part,
14D spring fastening part,
20 housing (20A receiving side housing, 20B movable side housing),
201 protrusion,
202 engaging hole,
21 outer housing,
211 shutter,
22 inner housing,
221 module mounting part,
23 connecting mechanism,
31 boot,
32 coupling,
40 regulating part (front side end-face of engaging part 14A, front side end-face of spring fastening part 14D),
100 optical connector system Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical connector comprising:
a ferrule comprising a brim part and a first front end-face;
an elastic member that presses the ferrule;
a housing that houses the ferrule retractably and that comprises:
  a protrusion that contacts the brim part of the ferrule pressed by the elastic member and prevents the ferrule from falling out forward, and
  a second front end-face; and
a regulating part that regulates a rear side limiting position of the ferrule,
wherein, when the connector is disconnected, an interval from a position of the ferrule to the rear side limiting position is smaller than an interval from the second front end-face to the first front end-face.

2. The optical connector according to claim 1, further comprising:
a receiving part that fixes a rear end of the elastic member to the housing,
wherein the receiving part comprises the regulating part.

3. The optical connector according to claim 2, wherein
the receiving part comprises an engaging part that engages with an engaging hole of the housing, and
the engaging part comprises the regulating part.

4. The optical connector according to claim 2, wherein
the receiving part comprises a fastening part that fixes the rear end of the elastic member, and
the fastening part comprises the regulating part.

5. The optical connector according to claim 4, wherein
the elastic member is a coil-shaped spring, and
the regulating part is disposed inside the spring.

6. The optical connector according to claim 1, wherein
the ferrule comprises a recess portion recessed from the first front end-face and a lens part that passes through an optical signal, and the lens part is formed in the recess portion.

7. The optical connector according to claim 6, wherein
a pressing force of the elastic member that presses the ferrule is in a range of 2N to 7N.

8. An optical connector system comprising:
two optical connectors to be connected with each other, each of the optical connector comprising:
  a ferrule comprising a brim part and a first front end-face;
  an elastic member that presses the ferrule;
  a housing that houses the ferrule retractably and that comprises:
    a protrusion that contacts the brim part of the ferrule pressed by the elastic member and prevents the ferrule from falling out forward, and
    a second front end-face; and
  a regulating part that regulates a rear side limiting position of the ferrule,
wherein, when the connectors are disconnected, an interval from a position of the ferrule of one optical connector to the rear side limiting position is smaller than an interval from the second front end-face to the first front end-face of another optical connector.

\* \* \* \* \*